Feb. 17, 1970  S. F. DAYMOND  3,495,856
EXPANSION JOINT

Filed June 3, 1968  2 Sheets-Sheet 1

INVENTOR
STEWART F. DAYMOND

By Cushman, Darby & Cushman
ATTORNEYS

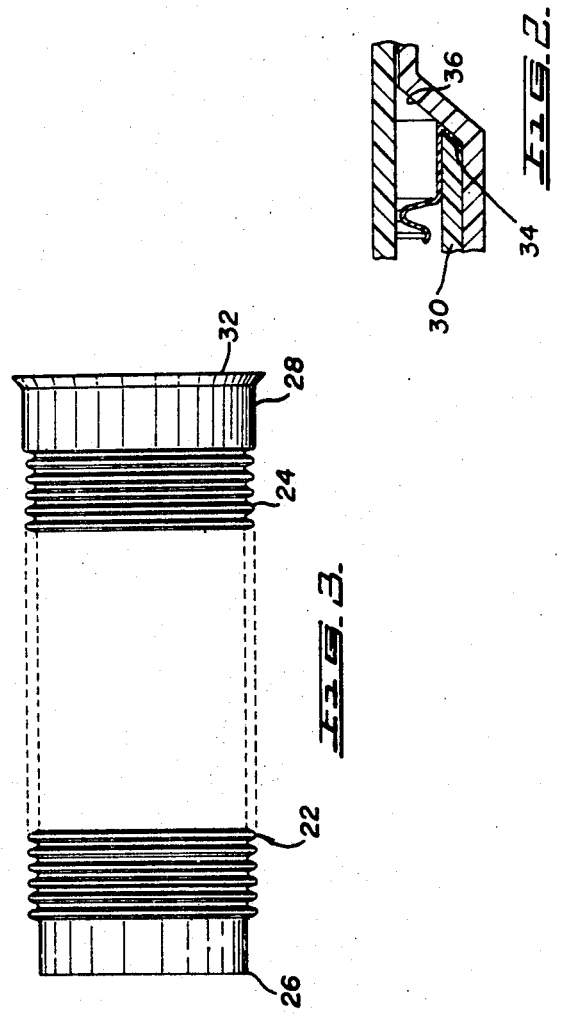

United States Patent Office 3,495,856
Patented Feb. 17, 1970

3,495,856
EXPANSION JOINT
Stewart F. Daymond, Chatham, Ontario, Canada, assignor to The Daymond Company Limited, Chatham, Ontario, Canada
Filed June 3, 1968, Ser. No. 734,035
Claims priority, application Canada, Apr. 5, 1968, 16,802
Int. Cl. F16l 27/12
U.S. Cl. 285—300          9 Claims

ABSTRACT OF THE DISCLOSURE

An expansion joint of the type including a flexible bellows member which is interposed between inner and outer tubular joint members one of which is slidable within the other. All of the components of the joint are made from organic synthetic material and the entire structure is fabricated in such a manner that the several parts may be securely bonded together preferably by means of chemical or solvent type bonds. The mating surfaces for the regions to be bonded together are made relatively large thereby to provide adequate strength.

---

The present invention relates to an improved expansion joint of the type including a section of corrugated tubing and adapted to absorb expansion and contraction in a piping system resulting from temperature variation.

The prior art provides numerous types of expansion joints of the nature indicated above. In general, the great majority of the prior art expansion joints have been specially designed with high temperature, high pressure applications in mind and accordingly the constructions proposed are relatively expensive to manufacture. Over the past few years the increasing use of synthetic resins in low pressure, low temperature piping and plumbing systems has given rise to the need for a relatively low cost, easily fabricated expansion joint structure of material which is non-corrosive and which is compatible with the material used in the system of which the expansion joint forms a part. It has also become apparent that there is a need for an expansion joint which may be quickly connected in a piping system without the use of flanged or threaded fittings or conventional metallic welds, all of the above conventional types of connections generally requiring the use of skilled workmen.

The present invention provides an expansion joint specially designed for fabrication from synthetic organic resins wherein the majority of the components of said expansion joint are standard, commercially available items with the number of such components reduced to a bare minimum, and wherein the complete structure is devoid of conventional screwed or flanged connections. The expansion joint is designed such that the various components thereof may be readily secured together by fusing mating sufaces of the components together, particularly fusing by means of plastic bonding chemicals or by the use of solvents applied to the surfaces of the components which are to be engaged together. The corrugated bellows element of the expansion joint of the present invention is fabricated from a suitable synthetic resin at a fraction of the expense normally incurred during the fabrication of the usual metallic bellows found in expansion joints of the type under consideration.

Accordingly, the present invention provides, in one aspect, an expansion joint which includes inner and outer tubular pipe members of synthetic plastics resin, the inner pipe member being slidable within the outer pipe member. The outer pipe member has a diameter substantially greater than the diameter of the inner pipe member such that an annular chamber is defined therebetween. A flexible bellows member of synthetic organic material is disposed in the annular chamber. This expansion bellows has a series of annular corrugations formed therein in an intermediate portion thereof and the bellows includes opposed tubular end portions free of such corrugations. These tubular end portions define mating surfaces having substantial area to assist in securement of the bellows within the expansion joint. A first one of the bellows end portions is securely bonded to the outer surface of the end portion of the inner tubular pipe member. The second bellows end portion is securely bonded to an inside surface of the outer tubular pipe member. The first bellows end portion preferably has a diameter such that fits snugly over the end portion of the inner tubular pipe member so that the two may be readily bonded together by suitable means while the opposite bellows end portion preferably has a diameter substantially equal to the inside diameter of the outer tubular pipe member thus readily permitting securement of the two together by any suitable means such as by chemical solvent bonds or suitable adhesives.

The apparatus of the present invention is primarily designed for low or zero pressure applications, such as for waste disposal systems wherein the prime consideration is resistance to chemical attack.

An embodiment of the invention will now be described with reference being had to the accompanying drawings wherein:

FIG. 2 is an enlarged sectional view of the portion of the expansion joint shown as encircled in FIG. 1;

FIG. 3 is an elevation view of the bellows-type expansion element used in the expansion joint of the present invention.

Figure 1:
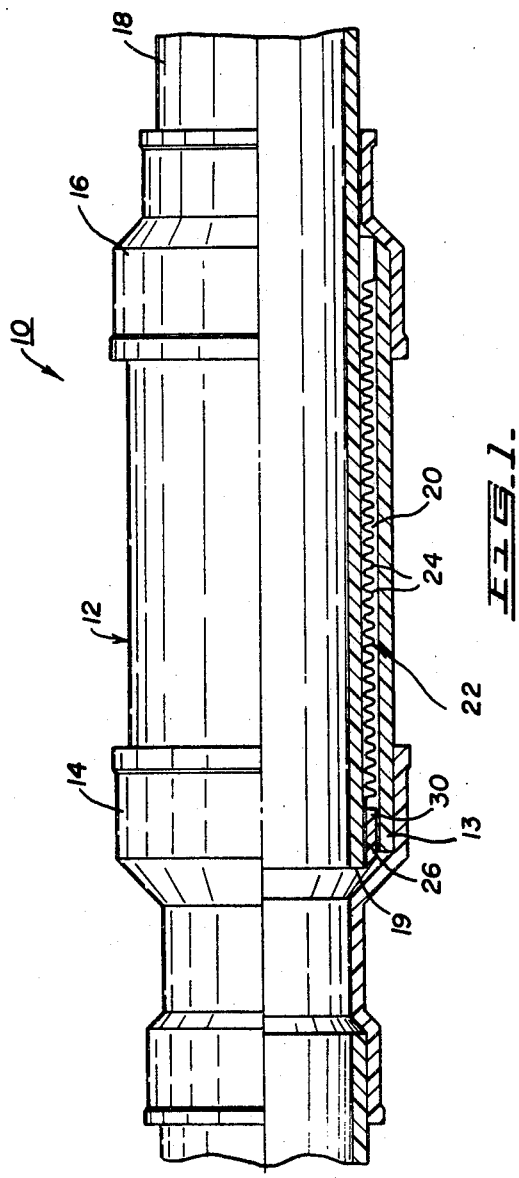
FIG. 1 is an elevation view, partially in section taken along the longitudinal axis of the expansion joint.

The expansion joint 10 which is suited for low pressure low temperature applications includes an outer casing comprising an outer cylindrical pipe member 12 having opposed bell-type housings 14 and 16 connected to opposing ends thereof. An inner cylindrical pipe member 18 extends in sliding relationship through the bell housing 16 and thence into the interior of the expansion joint to a position closely adjacent the end 13 of outer pipe member 12 whereat opposed bell housing 14 is connected.

The inner pipe 18 is substantially smaller in diameter than the outer casing pipe 12 thereby to define a generally annular chamber 20 between the inner wall of pipe 12 and the outer wall of inner pipe 18. Disposed in this annular chamber 20 is an expansion bellows 22 in the form of an elongated tube of circular cross-section having a series of annular corrugations 24 formed therein throughout a substantial portion of the length thereof.

The expansion joint is designed such that its several components can economically be fabricated throughout from generically related synthetic materials and readily bonded together with there being no need for threaded connections of any kind. The above point will be illustrated first by describing fully the expansion bellows 22 and its manner of connection to the other components of the expansion joint. FIGURE 3 reveals the expansion joint as having annular corrugations 24 throughout the intermediate portion of its length, with such corrugations terminating at the opposing respective end portions 26 and 28 thereof. End portion 26 of bellows 22 is free of corrugations and has a diameter chosen such that it snugly embraces the end portion 19 of inner pipe 18 and is firmly bonded thereto when in the assembled condition shown in FIG. 1. The cylindrical bellows end portion 26, when connected to pipe 18, is surrounded by and firmly bonded to ring 30, the latter serving to firmly sandwich bellows end portion 26 between ring 30 and the outer surface of the end portion 19 of inner pipe 18. The opposing end 28 of bellows 22 is also free of corrugations and has a diameter substantially greater than the diameter of the opposite end portion 26 whereby end portion 28 equals the inside diameter of the outer pipe 12 thus permitting them to be securely bonded together. As shown in FIG. 3 the end portion 28 of bellows 22 is also provided with a portion 32 which is flared outwardly, preferably by an angle of 45° to the axis of the bellows. In the assembled condition this flared portion 32 is folded down over the end portion 28 so as to make an acute angle therewith and interposed between an annular recess defined end wall 34 and the inner frusto-conical wall 36 of bell housing 16 as clearly shown in FIG. 2. This assists in securely anchoring end portion 28 to the casing of the expansion joint thus making the same more reliable and trouble-free even under severe service conditions.

All of the components of the illustrated expansion joint are made from compatible synthetic plastic resins. Particularly good results are achieved through the use of acrylonitrile-butadiene-styrene, hereinafter termed A.B.S. This material is particularly compatible with chemical or solvent type bonding agents, is strong, durable and resistant to attack from all materials normally carried by the drainage and sewerage systems in which this invention finds particular application.

The expansion bellows 22 which is preferably made from A.B.S. provides a bellows which is flexible, free from cracking, and which may be readily and economically fabricated by blow moulding. One typical expansion bellows made from A.B.S. had a nominal diameter of 3½ inches, an overall length of 9¾ inches, a wall thickness of about 0.030 inch and was provided with 4 complete annular corrugations per inch of length. Other sizes and wall thicknesses for the expansion bellows 22 are of course possible.

The remainder of the expansion joint is preferably also made from A.B.S. with the wall portions of the several components being made sufficiently thick as to provide a rigid, substantially crush-proof joint casing.

The several components of the expansion joint may be held together with an adhesive or, as a preferred alternative, the mating surfaces of the several components may coated with a suitable chemical which dissolves a portion of such mating surfaces. The parts are joined together and, as soon as the solvent has evaporated away, a firm integral bond or weld between the mating surfaces is formed. In actual fact the entire structure becomes one homogenous body, with no discernible interfaces between the several components. One of the most suitable chemical bonding agents for use with A.B.S. is a solution of A.B.S. in methyl ethyl ketone. Although chemical or solvent type bonds of the nature set out above are preferred, other bonding techniques utilizing heat energy and the like may also be used.

In view of the nature of the bonding techniques used in connection with the novel expansion joint it is important that the expansion joint be designed such that the joints so formed be as strong as reasonably possible. This strength is provided by arranging for the areas of the mating surfaces which are bonded together to be relatively large. This is readily illustrated by observing the manner in which the expansion bellows is joined at its one end 26 to the inner pipe 18 and at its other end to the casing of the joint. It will be noted here that the uncorrugated portions 26 and 28 of the expansion bellows provide relatively large areas of securement of the bellows 22 to the inner pipe 18 and to the casing hence reducing greatly the chances of failure of the joint. In like manner, the opposed bell housings 14 and 16 which fit snugly over opposing end portions of the outer casing pipe 12 in telescoping relation therewith are arranged to provide relatively large areas of securement between themselves and the above mentioned pipe 12.

As mentioned previously, a further feature of the present invention resides in the fact that the design of the expansion joint permits that many of the components of the expansion joint are standard, commercially available items. For example the inner pipe 18 and outer pipe 12 are conveniently made from standard A.B.S. pipe stock. In addition the bell housings 14 and 16 are standard components. Since the expansion bellows 22 may be readily fabricated by blow molding, it also is relatively inexpensive.

In use, the expansion joint 10 is interposed in a pipe line subject to thermal expansion and contraction. The bell housing 14 is connected by a suitable bond to pipe 40 which pipe 18 is connected by suitable coupling means, not shown, to a further pipe. Expansion and contraction of the piping system causes relative axial motion between inner pipe 18 and the casing of the expansion joint with inner pipe 18 sliding freely back and forth through bell housing 16 with the annular corrugations of the expansion bellows 22 taking up the change in length which occurs.

Although acrylonitrile-butadiene-styrene is the preferred material to be used in the present expansion joint, it should be also possible to use several other formulations such as: polythene, polyvinyl chloride, cellulose acetate, cellulose acetate butyrate as well as other suitable thermoplastic resins, provided however that such materials can readily be bonded together in the manner described previously.

Various modifications and equivalents falling within the scope of the present invention will occur to those skilled in the art.

I claim:

1. An expansion joint comprising:
   (a) an outer elongated casing including: an outer elongated cylindrical pipe member and a pair of open ended bell-type housings, each of the latter being connected to a respective one of the opposing ends of said cylindrical pipe member in telescoping relationship therewith and securely bonded thereto,
   (b) an inner pipe member extending through one of said bell-type housings in sliding relation therewith, said inner pipe member extending within said casing along its longitudinal axis such that one end thereof is disposed adjacent the other one of said bell-type housings, said inner pipe member being of substantially smaller diameter than said outer pipe member thereby defining an elongated annular chamber between said inner and outer pipe members,
   (c) and an elongated expansion bellows comprising a tubular element of organic synthetic resin material disposed in said annular chamber, said expansion bellows having a series of annular corrugations formed therein in an intermediate portion thereof and having opposed tubular end portions free of said corrugations, defining mating surfaces having substantial area to assist in securement of said bellows within said expansion joint,
   (d) a first one of said end portions of said bellows being securely bonded to the outer surface of, and adjacent said one end of said inner pipe member, and a circular ring embracing said first one of said end portions and securely bonded thereto thereby to firmly sandwich said first one of the bellows end portions between said ring and the surfaces of said one end of said inner pipe member,
   (e) and the second one of the end portions of said bellows being of greater diameter than the first one of said end portions, the second bellows end portion being securely bonded to an inner surface of said outer cylindrical pipe member closely adjacent said one of said bell-type housings, the second bellows end portion also including an outwardly flared portion,
   (f) said casing including means defining an annular recess therein snugly receiving said outwardly flared portion on said bellows thereby to assist in firmly securing the second end portion of the latter to said casing.

2. An expansion joint according to claim 1 wherein said expansion bellows is made entirely of acrylonitrile-butadiene-styrene.

3. An expansion joint according to claim 2 wherein said entire casing together with said inner pipe member is of acrylonitrile-butadiene-styrene material, and wherein all of said bonds between the several components of the expansion joint are chemical solvent-type bonds.

4. An expansion joint comprising: means defining inner and outer tubular joint pipe members of synthetic plastics resin, the inner pipe member being arranged within the outer pipe member so that relative axial movement may take place therebetween, with the outer tubular pipe member having a diameter greater than said inner tubular pipe member whereby an annular chamber is defined therebetween, a flexible bellows member of organic synthetic material disposed in said annular chamber, said expansion bellows having a series of annular corrugations formed therein in an intermediate portion thereof and having opposed tubular end portions free of said corrugations, which define mating surfaces having substantial area to assist in securement of said bellows within said expansion joint, a first one of said end portions of said bellows having a diameter such that it fits snugly over an end portion of the inner tubular pipe member, said first bellows end portion being securely bonded to the outer surface of said end portion of the inner tubular pipe member, and the second one of said bellows and portions having a diameter substantially equal to the inside diameter of the outer tubular pipe member, with said second bellows end portion being securely bonded to an inside surface portion of the latter whereby said bellows is firmly secured within said expansion joint, the outer and inner diameters, respectively, of said inner and outer members being substantially constant throughout the length of said bellows member.

5. An expansion joint according to claim 4 wherein said flexible bellows is of acrylonitrile-butadiene-styrene.

6. An expansion joint according to claim 5 wherein the tubular pipe members are of acrylonitrile-butadiene-styrene and wherein said flexible bellows is secured to said tubular pipe members by means of chemical solvent bonds.

7. An expansion joint according to claim 6 further comprising a ring encircling and firmly bonded to said first one of the bellows end portions.

8. An expansion joint according to claim 6 wherein the outer tubular pipe member includes an open ended bell-type housing connected to each of the opposing ends of the tubular pipe member in telescoped relationship therewith and firmly bonded thereto, with said inner tubular pipe member extending through one of said bell-type housings in sliding relation therewith.

9. An expansion joint comprising:
(a) an outer elongated casing of synthetic resin material, said casing including: an outer elongated cylindrical pipe member and a pair of open ended bell-type housings, each of the latter being connected to respective ones of the opposing ends of said cylindrical pipe member in telescoping relationship therewith and securely bonded thereto,
(b) an inner pipe member of synthetic resin material extending through one of said bell-type housings in sliding relation therewith, said inner pipe member extending within said casing along its longitudinal axis such that one end thereof is disposed adjacent the other one of said bell-type housing, said inner pipe member being of substantially smaller diameter than said outer pipe member thereby defining an elongated annular chamber between said inner and outer pipe members,
(c) and an elongated expansion bellows comprising a tubular element of organic synthetic resin material disposed in said annular chamber, said expansion bellows having a series of annular corrugations formed therein in an intermediate portion thereof and having opposed tubular end portions free of said corrugations and defining mating surfaces having substantial area to assist in securement of said bellows within said expansion joint,
(d) a first one of said end portions of said bellows having an inside diameter such as to snugly embrace the outer surface of the inner pipe member, said first one of said end portions being securely bonded to the outer surface of, and adjacent said one end of said inner pipe member, and a circular ring of synthetic resin material embracing said first one of said end portions and securely bonded thereto thereby to firmly sandwich said first one of the bellows end portions between said ring and outer surface of said one end of said inner pipe member,
(e) and the second one of the end portions of said bellows having an outside diameter substantially equal to the inside diameter of the outer cylindrical pipe member with the second bellows end portion being securely bonded to the surface of said outer cylindrical pipe member closely adjacent said one of said bell-type housings, the outer and inner diameters, respectively, of said inner and outer members being substantially constant throughout the length of said bellows member.

References Cited

UNITED STATES PATENTS

| 247,591 | 9/1881 | White | 285—300 |
|---|---|---|---|
| 1,929,401 | 10/1933 | Badger | 285—301 |
| 2,437,385 | 3/1948 | Halford. | |
| 3,068,026 | 12/1962 | McKamey | 285—300 X |
| 3,313,319 | 4/1967 | Osborn et al. | 285—226 X |

FOREIGN PATENTS

| 683,468 | 3/1964 | Canada. |
|---|---|---|
| 898,383 | 6/1962 | Great Britain. |
| 981,498 | 1/1965 | Great Britain. |

DAVID J. WILLIAMOWSKY, Primary Examiner

DAVE W. AROLA, Assistant Examiner

U.S. Cl. X.R.

285—423